(12) United States Patent
Huignard et al.

(10) Patent No.: US 6,288,805 B1
(45) Date of Patent: *Sep. 11, 2001

(54) HOLOGRAPHIC PROJECTION SCREEN AND METHOD OF PRODUCTION

(75) Inventors: Jean-Pierre Huignard; Cécile Joubert, both of Paris; Jean-Claude Lehureau, Ste Genevieve des Bois; Brigitte Loiseaux, Villebon S/Yvette, all of (FR)

(73) Assignee: Thomson-CSF, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/596,135
(22) PCT Filed: Jun. 16, 1994
(86) PCT No.: PCT/FR94/00727
 § 371 Date: Feb. 15, 1996
 § 102(e) Date: Feb. 15, 1996
(87) PCT Pub. No.: WO95/34832
 PCT Pub. Date: Dec. 21, 1995
(51) Int. Cl.[7] ................. G03H 1/00; G03H 1/02
(52) U.S. Cl. ............................. 359/28; 359/30
(58) Field of Search .................. 359/1, 10, 12, 359/15, 22, 32, 563, 564, 566, 567, 569, 576, 28

(56) References Cited

U.S. PATENT DOCUMENTS

| 3,851,948 | * | 12/1974 | Gange et al. ............... 359/6 |
| 5,046,793 | * | 9/1991 | Hockley et al. ............ 359/12 |
| 5,187,597 | * | 2/1993 | Kato et al. ................. 359/22 |
| 5,856,048 | * | 1/1999 | Tahara et al. ............... 430/1 |

OTHER PUBLICATIONS

T.A. Shankoff, Phase Holograms in Dichromated Gelatin, Applied Optics, vol. 7, pp. 2101–2105, Oct. 1968.*
P. Hariharan, Criteria for thin holograms and volume holograms, Optical Holography (Cambridge Studies in Modern Optics: 2), pp. 58–59, Cambridge University Press 1984, ISBN 0 521 31163.*

* cited by examiner

Primary Examiner—Cassandra Spyrou
Assistant Examiner—Jared Treas
(74) Attorney, Agent, or Firm—Oblon, Spivak, McClelland, Maier & Neustadt, P.C.

(57) ABSTRACT

A holographic projection screen for large screen projection and back projection with a liquid crystal projector. The screen includes at least one layer made of a photosensitive material in which at least one index grating may be recorded by an interference of an optical recording wave with an optical object wave. The thickness of the layer is equal to or greater than $n_0 \Lambda^2/2\pi$, where $n_0$ is the average index of the photosensitive material, $\Lambda$ is the average spacing of the index grating and $\lambda$ is the recording wavelength.

17 Claims, 5 Drawing Sheets

HOLOGRAPHIC PROJECTION SCREEN AND METHOD OF PRODUCTION

BACKGROUND OF THE INVENTION

Field of the Invention

The invention relates to a holographic projection screen and its method of production.

A projection system consists of an emitting image of small size, which is magnified by suitable optics and projected onto a screen. The emitting image is generally an active or non-active transmitting element illuminated by a collimated light source.

When the projection is so-called front projection, the observer is placed on the same side as the projector in relation to the screen, which then reflects the image towards the observer.

When the projector illuminates the rear of the screen in relation to the observer, it is a back-projecting screen.

Given the low brightness of the images coming from the projector, it is preferable for the screen to be directional and to have gain so that a large part of the light emitted by the screen reaches the observer's eye.

Moreover, in the case of front-projection screens, it may be advantageous for reasons of convenience to be able to position the projector, not in the center in relation to the projection screen, but to the sides or above or below. This type of projector operation is usually obtained by off-centering the emitting image in relation to the optical axis of the projection system.

However, in order for the light scattered by the screen to reach the observer, it would be necessary in this case for the screen with gain to possess a luminance indicatrix off-axis in relation to the direction of the reflected mid-ray. Thus, as is shown in FIG. 1, an incident beam F1 (projection beam) is reflected off the screen SC, in a conventional manner, along a direction F2. In order for it to reach the observer, it is necessary for it to be directed along a lobe direction F3.

Such a screen, being on principle outside the laws of geometrical reflection, cannot be produced in a conventional structure. However, it is known how to produce, in conventional optics, screens which, in transmission, bring about these scattering functions with "off-axis" gain. These are complex structures of the Fresnel-lens type. As a consequence, standard front-projection systems use screens either with very low gain (movie theater), or of the Lambertian type.

Moreover, the low contrast of the projected image, once the ambient illumination increases, should be noted as a major drawback of front-projection devices. This is connected with the very nature of the screen, of the white-surface type, which rescatters a large part of the incident light irrespective of its source.

Devices of the "back-projection" type, the scattering screen of which possesses a "black matrix" which enables the contrast of the image to be substantially increased for the same ambient illumination, are thus generally preferred.

In order to illustrate the state of the art, the following document describing various projection devices is cited:

M. KAWASHIMA et al, "Display and projection devices for HDTV", IEEE Transactions on Consumer Electronics, Vol. 34, No. 1, February 1988, 100–110.

SUMMARY OF THE INVENTION

The subject of the invention is a screen produced by a holographic method more specifically suited to front projection and making it possible to provide the various desired characteristics illustrated in FIG. 2.

The quantity of light which reaches the observer's eye depends:

on the direction of the mid-ray coming from the image to be projected, reflected by the screen towards the observer;

on the lobe of light scattering around the mid-ray.

The main characteristics desired are:

re-direction, at each point of the screen, of the mid-ray coming from the projection direction into the objective of the observer (horizontal direction, for example): off-axis operation. The orders of magnitude of the angles of incidence on the screen are specified in FIG. 2. They can be varied from one end of the screen to the other;

scattering of the light around the mid-ray;

screen gain: anisotropic scattering lobe, wider in the horizontal than in the vertical, typically plus or minus 15° in the vertical for plus or minus 30° to plus or minus 45° in the horizontal, depending on the applications;

production of these functions for the three primary colors, red, green and blue, without color shift;

minimum scattering of the ambient light towards the observer in order to obtain better contrast.

The invention therefore relates to a holographic projection screen which includes at least one layer made of photosensitive material in which at least one index grating may be recorded by interference of an optical recording wave with an optical object wave, the thickness of the layer made of photosensitive material being greater than or equal to $n_0 \Lambda^2 / 2\pi\lambda$ $n_0$ being the average index of the photosensitive material;

$\Lambda$ being the average spacing of the index grating;

$\lambda$ being the recording wavelength.

The invention also relates to a method for producing a holographic screen, characterized in that:

at least one layer of a photosensitive material is produced, enabling at least one layered index grating to be recorded by interference of an object wave with a recording wave, the thickness of this layer being greater than or equal to $n_0 \Lambda^2 / 2\pi\lambda$.

$n_0$ being the average index of the photosensitive material;

$\Lambda$ being the average spacing of the index grating;

$\lambda$ being the recording wavelength;

the layered index grating is recorded by illuminating the layer with the aid of an object wave making a first angle of incidence with the plane of the layer and of a recording wave making a second angle of incidence with the plane of the layer.

BRIEF DESCRIPTION OF THE DRAWINGS

The various objects and characteristics of the invention will appear more clearly in the description which follows, given by way of example, with reference to the appended figures which represent.

DESCRIPTION OF THE PREFERRED EMBODIMENTS

The screen according to the invention is a diffracting phase structure which, illuminated by the rays coming from the image to be projected, diffracts a scattered wave into a chosen mid-ray and having a scattering lobe which is also chosen, thus ensuring the two functions, off-axis gain and scattering.

This screen includes a hologram produced optically, possibly in one overall step and not mechanically machined point by point.

This hologram is recorded in a holographic plate 1 (see FIGS. 3a, 3b, 4a, 4b) which includes a photosensitive layer enabling the hologram to be recorded. This photosensitive layer has the characteristic of having a thickness d which satisfies the relationship $$2\pi \lambda d/n_0 \Lambda^2 >= 1$$

in which:

λ=recording wavelength
d=thickness of the photosensitive layer
$n_0$=average index of the photosensitive medium
Λ=average spacing of the recorded grating.

With such a photosensitive layer, as will be seen hereinbelow, a screen will be obtained after recording with a wave $W_r$ making a defined angle incidence, said screen reflecting only light incident at virtually the same angle and will therefore be insensitive to ambient light. The recorded grating will have a so-called Bragg spectral and angular selectivity properties and high diffraction efficiency at the recording wavelength.

Figure 3A:
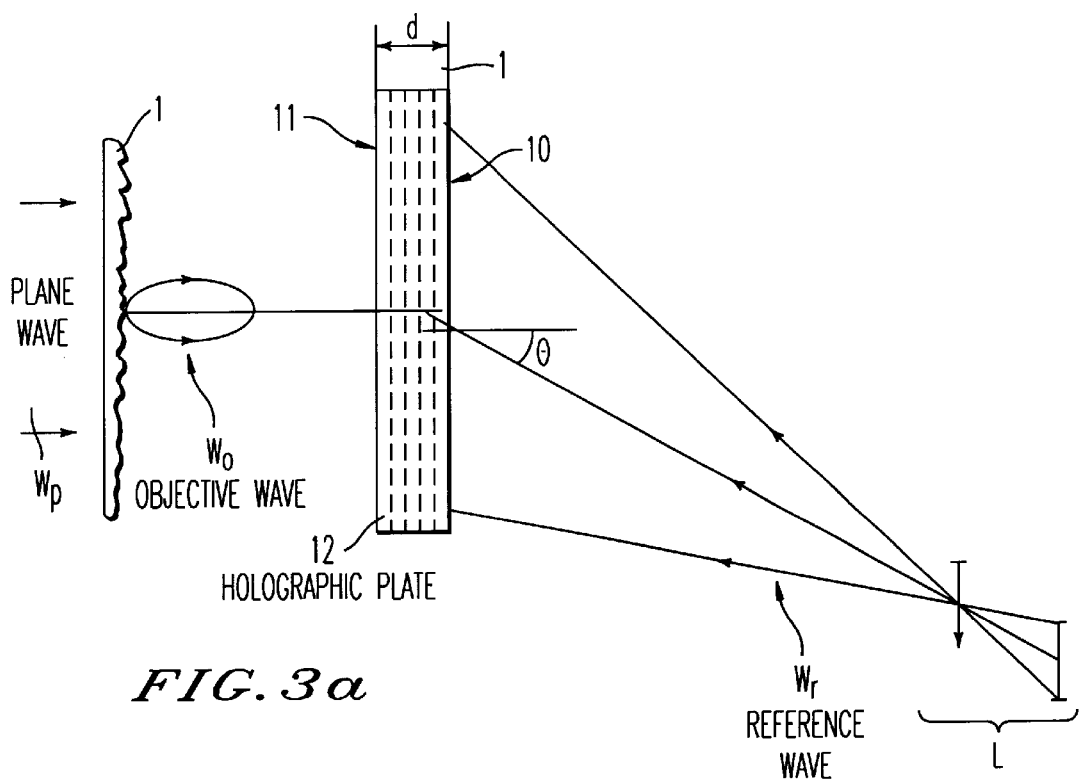
FIGS. 3a and 3b, an exemplary embodiment of a front-projection screen according to the invention.

Referring to FIG. 3a, a method will be described for producing a front-projection screen according to the invention, operating for a narrow wavelength range around one of the three primary wavelengths of the color triangle.

As is shown in FIG. 3a, a light source L, illuminating the face 11 of a holographic plate with a light wave $W_r$ at an incidence of θ degrees, is positioned. A light-scattering grating 2 is placed parallel to the face 11 of the holographic plate. Preferentially, the grating 2 touches, or virtually touches, the face 11. The scattering grating receives an illumination wave $W_p$ and retransmits a scattered wave $W_o$ to the plate 1. Preferably, the illumination object wave $W_p$ is a plane wave perpendicular, or virtually perpendicular, to the face 11.

Let us first recall that a hologram records the interferences between an object wave $W_o$ and a reference wave $W_r$. The hologram, once developed, reconstructs the object wave if the hologram is illuminated by the reference wave. The spatial frequency response (Λ−1) of the photosensitive material of the hologram can be exploited by adjusting the scattering lobe of the diffracted beam. It is therefore possible to combine the characteristics of the scattering grating and therefore of the scattering lobes of this grating with the response of the photosensitive material in order to adjust the scattering lobes of the hologram when reading.

Figure 1:
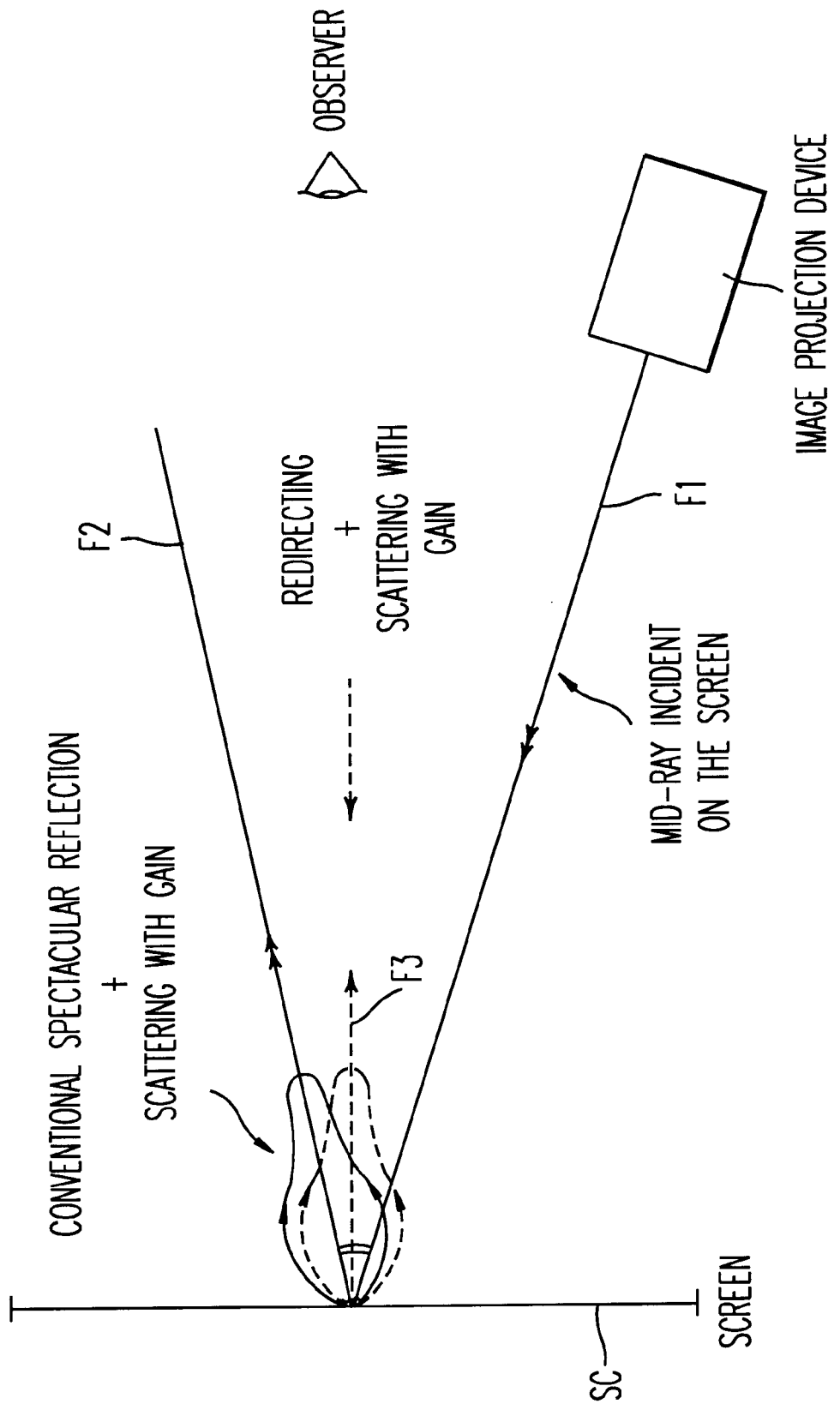
FIGS. 1 and 2, explanatory diagrams of the projection system, to which the invention must adhere.
Figure 2:
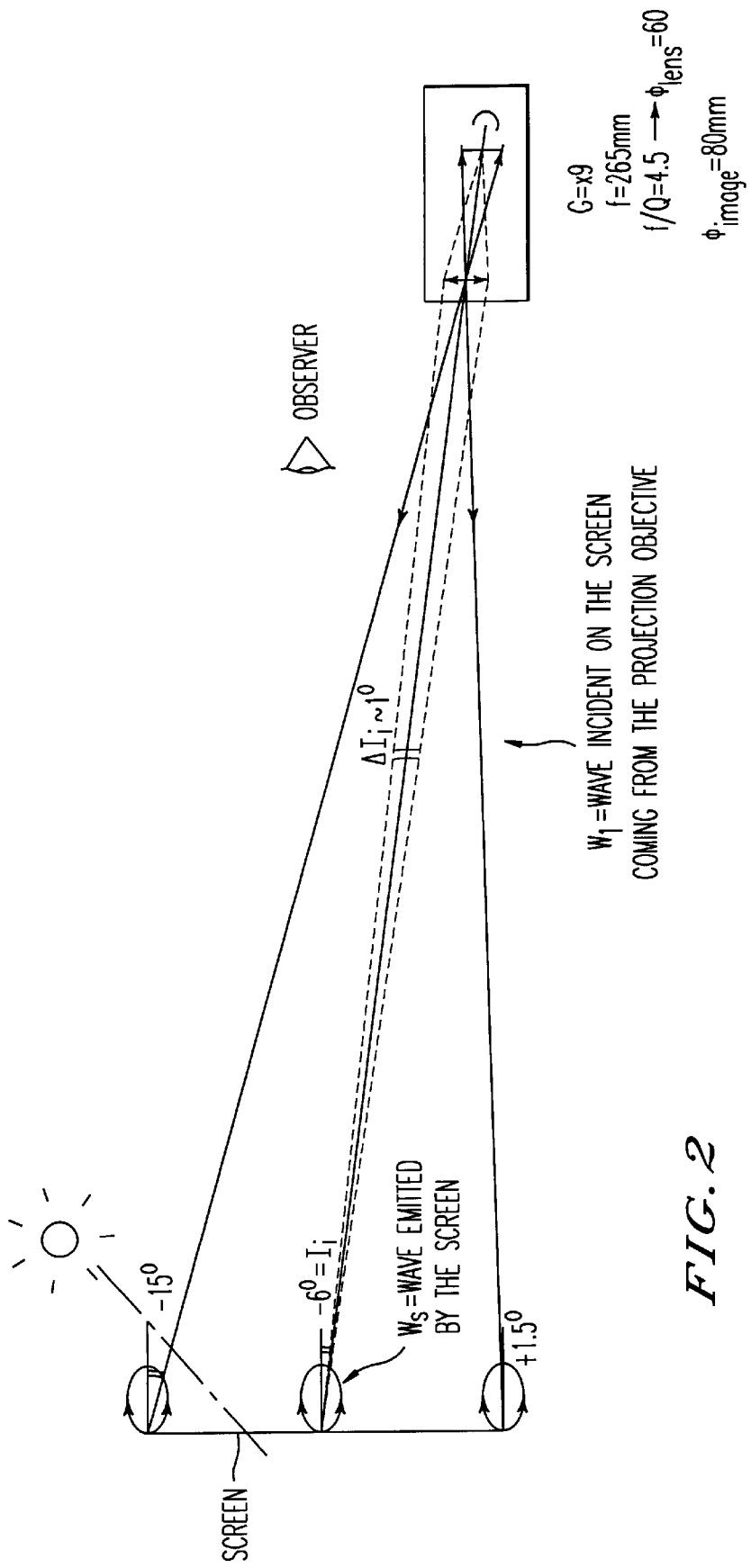

As is shown in FIG. 3a, when recording, the object wave $W_o$ consists of the wave coming from a scatterer 2 illuminated by a plane wave $W_p$ propagating along the horizontal axis. This wave $W_o$ must be as close as possible to the wave $W_s$ of FIG. 2, which it is desired to send to the observer. The holographic plate is placed parallel to the scatterer. The optimum reference or recording wave is the wave reaching the holographic plate 1 with the same angular characteristics as the wave $W_i$ of FIG. 2.

The holographic plate 1 includes a photosensitive medium of the photopolymer type or made of bichromated gelatin which records the intensity of the pattern of interference between the two waves $W_o$ and $W_r$, in the form of refractive-index variations (phase hologram).

The index grating recorded in the plate 1 is represented by the broken lines 12.

Figure 3B:
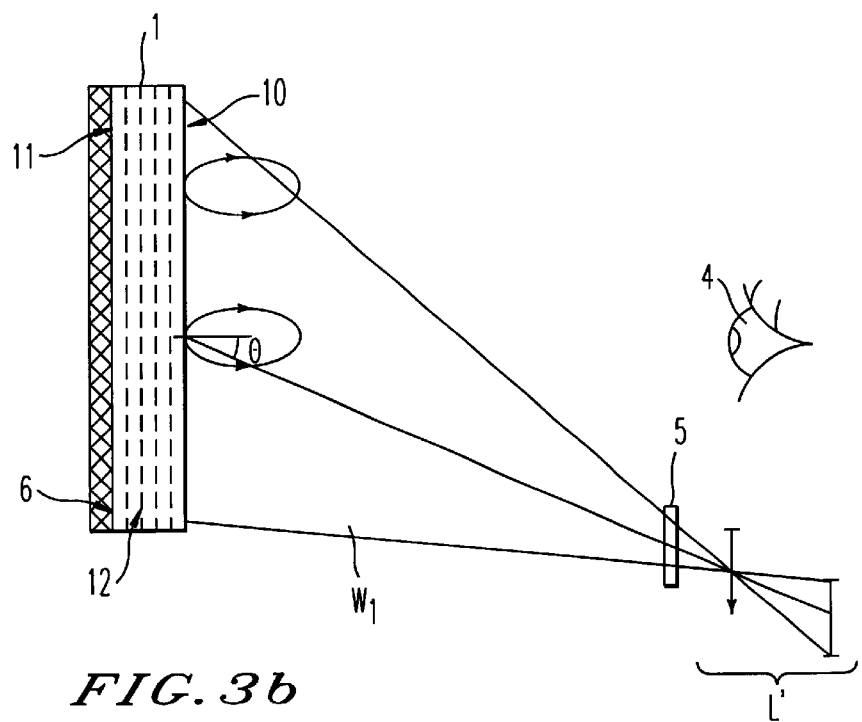

FIG. 3b shows the use of the screen of FIG. 3a, suitably recorded. After having recorded the hologram, the face 11 is covered with a light-absorbing layer 6.

The face 10 of the screen is illuminated by a read wave $W_i$ emitted by a light source L' of substantially the same wavelength as the source L of FIG. 3a and making, likewise substantially, an angle of incidence θ with the face 10 (as in FIG. 3a).

By reason of the reflection off the index grating recorded in the plate 1, the latter reflects the beam $W_i$ and transmits a scattered beam, similar to the object wave $W_o$, towards the observer 4. Light, which is not incident on the face 10 at the angle θ, passes through the layer 1, reaches the absorbing layer 6 and is absorbed by this layer.

By placing, between the source L' and the screen 1, a spatial light-intensity modulator 51 representing an image for example, this image will be displayed on the screen 1.

100% diffraction-function efficiency (diffraction operating in reflection or in transmission) may be obtained for a read wave $W_i$ having the same direction and the same wavelength as the reference wave $W_r$ (Bragg condition). In addition, for values of the index modulation Δη~0.04~0.07, the hologram possesses a significant angular and spectral bandwidth.

For example, for the previous case with an index variation of 0.05, if the hologram is read again with a wave of spectral width of plus or minus 30 nm about the recording wavelength, there will still be approximately 80% diffraction efficiency. This spectral width is typical for the primaries coming from white sources commonly used for projection. Likewise, with a wave having an angular width of plus or minus 3° in addition to a spectral width of 60 nm, 70% diffraction efficiency will be obtained. It is therefore possible to easily diffract the entire spectral width of a given primary.

On the other hand, ambient light which arrives on the screen with an incidence lying outside the angular bandwidth, centered on the Bragg incidence, is not diffracted by the screen towards the observer. It is transmitted by the layer 1 and then is absorbed by the layer 6, and the contrast of the projected image is thereby reinforced. This constitutes an additional advantage of the holographic screen.

FIG. 4 represents a recording method for a screen operating by back projection.

The photosensitive layer 1 of the screen has the same characteristics as described previously (d>>$n_0 \Lambda^2/2\pi\lambda$). The recording of a Bragg grating is performed as previously by interference of a reference wave $W_r$ with an object wave $W_o$. These two waves illuminate the same face 11 of the photosensitive layer 11. A layered grating 12 is thus recorded.

Figure 4A:
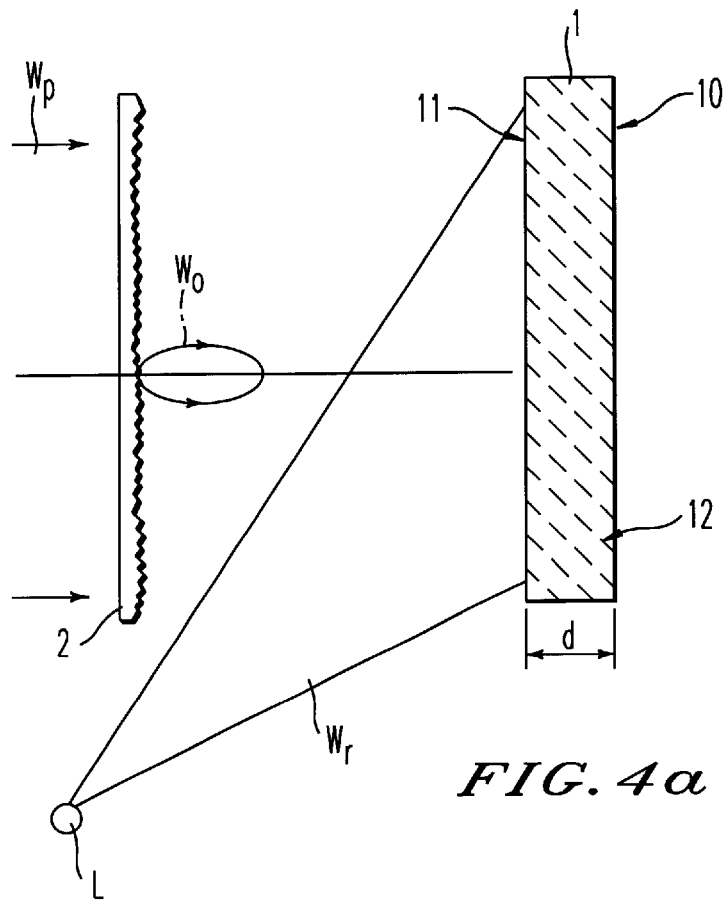
FIGS. 4a and 4b, an exemplary embodiment of a back-projection screen according to the invention.
Figure 4B:
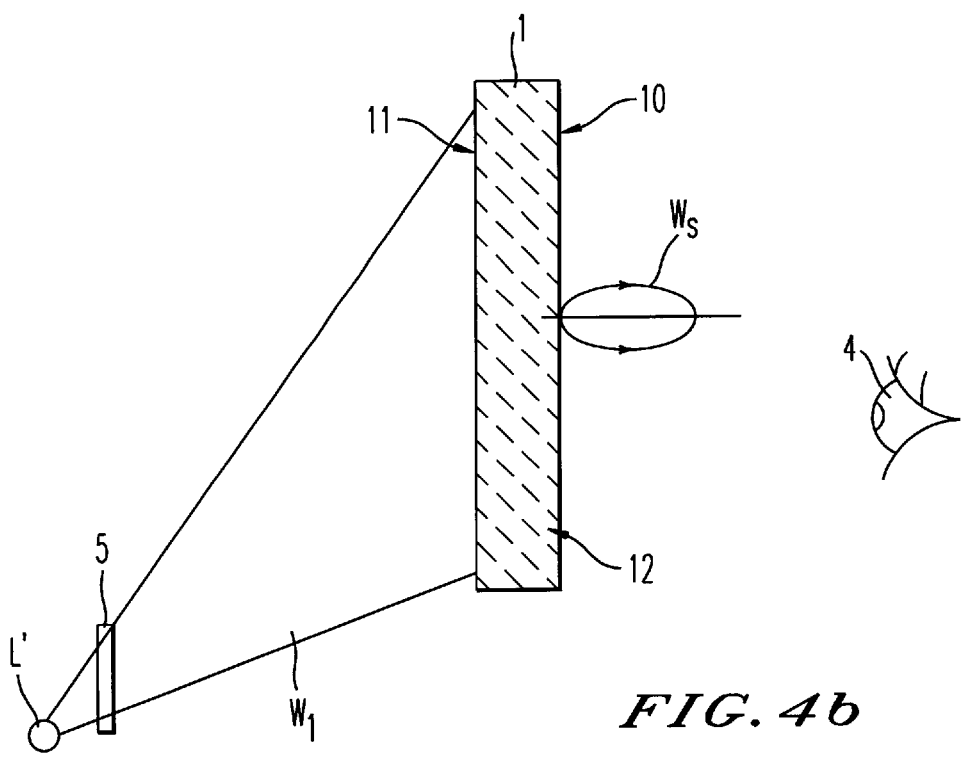

For reading, as is shown in FIG. 4b, a read wave $W_i$, virtually identical to the wave $W_r$ in inclination and in wavelength, illuminates the face 11. The layered grating 12 diffracts this beam and transmits a wave $W_s$ towards the observer 4. A spatial light-intensity modulator 5, or transparent image, placed between the source L' and the face 11 thus enables an image contained in the modulator 5 to be displayed by back projection.

In both projection cases (FIGS. 3b and 4b), it is possible to obtain 100% diffraction efficiency for the recording wavelength. The entire energy of the so-called "read" wave $W_i$ may be redirected into the horizontal axis with a chosen scattering lobe.

These conditions are produced with, for example:

$\lambda$=0.535 $\mu$m
average $\Lambda$=0.2; 0.4 $\mu$m
$n_0$=1.5
d=8 $\mu$m.

The invention has the following advantages:

High light efficiency: the very thin scattering screen absorbs little light. The exploitation of the Bragg effect enables the re-directing+ scattering functions to be produced with approximately 80% efficiency, taking into account the angular and spectral spread of the image to be projected.

Very high image contrast: the Bragg selectivity limits the reflection of ambient illumination.

A simple technology: the hologram is recorded in one step and no mechanical machining is necessary. This is not the case for current screens in transmission which use machined Fresnel microlenses of a few hundred microns in diameter to redirect the rays.

Optical duplication of the component once the "master" has been produced.

No loss of resolution connected, in conventional screens, with the size of the particle of the scatterer.

The above examples operate with a recording wavelength. Projection is therefore monochromatic. The invention can also be applied to the production of a trichromatic screen.

According to a first embodiment, the projection screen includes a layer made of material which is photosensitive over the entire spectrum of visible light. The thickness of the photosensitive layer is greater than $n_0\Lambda^2/2\pi\lambda_m$, in which $\lambda_m$ is the average wavelength of the spectrum of wavelengths to which the photosensitive layer is sensitive. In order to produce the screen, three monochromatic functions are recorded in the same photosensitive layer. Each monochromatic function is recorded, as described previously, with the aid of an optical wave, the wavelength of which corresponds to a primary (red, green or blue) wavelength and the direction of which makes an angle of incidence $\theta$ with the plane of the photosensitive layer. The recordings of the three monochromatic functions are performed simultaneously or separately at the same angle of incidence $\theta$ and with the same scattering grating 2.

As was described previously, the projection onto such a screen is performed with a trichrome source oriented towards the screen at the same angle of incidence $\theta$.

According to a second embodiment, the screen includes at least two layers made of photosensitive materials. Each of these layers is sensitive at a particular primary (red, green or blue) wavelength and is transparent at the other primary wavelengths.

Figure 5:
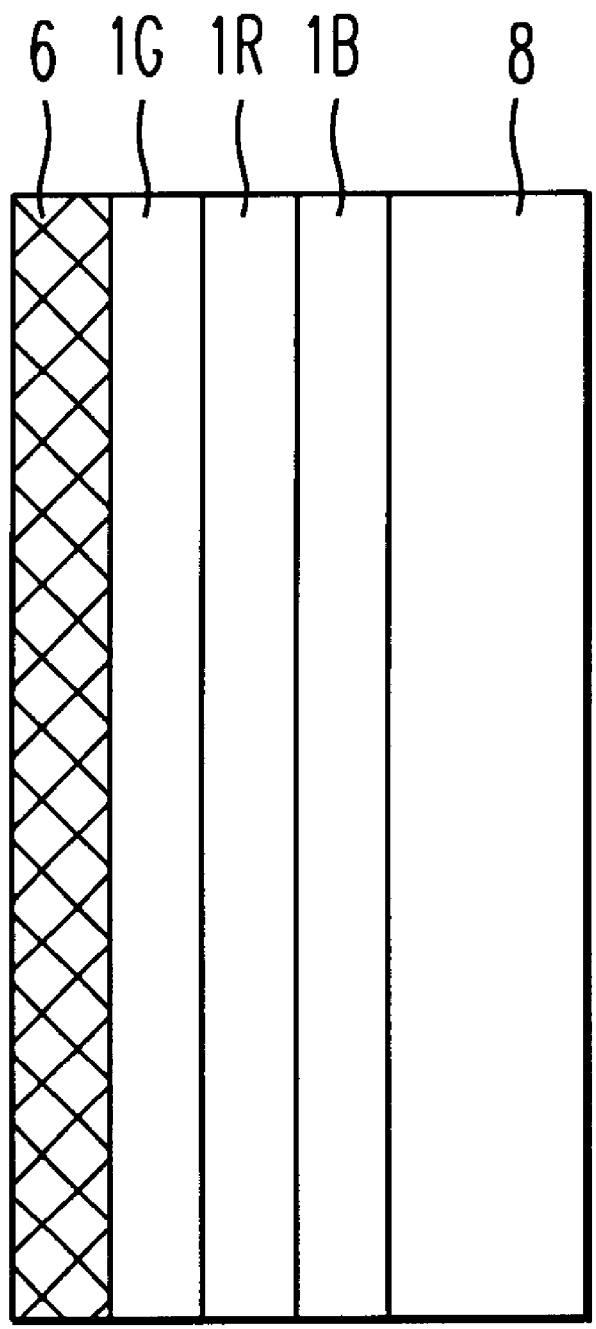
FIG. 5, a compact exemplary embodiment of a holographic device according to the invention.

According to FIG. 5, the three layers 1G, 1R, 1B are superposed. They are produced, for example, on a transparent support 8. Then, after recording the holograms in the layers 1G, 1R, 1B, a light-absorbing layer 6 is applied to the face of the screen not seen by the observer (in the case of the production of a front-projection screen).

The method of the invention also makes it possible to obtain dissymmetrization of the scattering lobe from each point on the screen.

Normally, observers are distributed or moved around in a horizontal plane in relation to the screen.

For reconstruction, when reading the diffracting screen, a scatterer having a greater scattering lobe in the horizontal than in the vertical, it suffices for the "object" scatterer (scattering grating 2) used during the recording to possess this property: the dissymmetry of the scattering lobe is then built into the screen during the recording of the holograms. This also applies if it is desired to have a screen having several scattering lobes.

Asymmetric scattering gratings exist and consist of an array or arrays of cylindrical microlenses associated with a symmetric scatterer. It is also possible to illuminate the scattering grating 2 with a wave which has a cross-section which is not circular but elliptical, the major axis in the horizontal. The scattered wave will then have the symmetry of the source.

Holographic scatterers having asymmetric or multi-lobed scattering characteristics also exist commercially.

Moreover, it should be pointed out that the reference wave is not strictly absolutely equal to the wave $W_i$, but in this case the efficiency of the screen illuminated by $W_i$ is not the optimum one.

It should also be pointed out that the wave illuminating the scatterer may be any wave whatsoever. It depends only on the average scattering direction which is required when reconstructing.

What is claimed is:

1. A holographic screen, comprising:

at least one photosensitive layer having at least one index grating recorded by interference between a recording wave having a first angle of incidence with respect to a plane of said at least one photosensitive layer, and a scattered object wave having a second angle of incidence with respect to the plane of said at least one photosensitive layer and being formed by transmitting a plane wave through a scattering grating; and a light-absorbing layer disposed on a back surface of said at least one photosensitive layer, said back surface being opposite to a front surface on which an image is to be formed, wherein a thickness (t) of said at least one photosensitive layer is defined by:

$$(t \geq (n_0 \Lambda^2)/(2\pi\lambda))$$

where $n_0$ is an average index of said at least one photosensitive layer;

$\Lambda$ is an average spacing of the at least one index grating; and $\lambda$ is a wavelength of the recording wave, wherein a combination of the at least one photosensitive layer and the light-absorbing layer are configured to absorb light which is not incident on the at least one photosensitive layer at the first angle of incidence of the recording wave, and wherein light incident on the at least one photosensitive layer at the first angle of incidence is reflected.

2. A holographic projection screen according to claim 1, wherein said at least one photosensitive layer is disposed in one of a front-projection screen and a back-projection screen.

3. A holographic projection screen according to claim 1, wherein said at least one photosensitive layer comprises a stack of photosensitive layers which are respectively photosensitive to a particular recording wavelength.

4. A holographic projection screen according to claim 1, wherein said at least one photosensitive layer comprises three photosensitive layers which are respectively photosensitive to wavelengths of different primary colors.

5. A holographic screen according to claim 1, wherein said photosensitive layer is photosensitive to a range of wavelengths comprising three primary color wavelengths, $\lambda$ being an average wavelength of said range of wavelengths.

6. A method for producing a holographic screen, comprising:

first illuminating at least one photosensitive layer with a scattered object wave having a first angle of incidence with respect to a plane of said at least one photosensitive layer, said scattered object wave being formed by transmitting a plane wave through a scattering grating, and said at least one photosensitive layer having a thickness (t) defined by the following equation:

$$(t \geq (n_0 \Lambda^2)/(2\pi\lambda))$$

where $n_0$ is an average index of said at least one photosensitive layer,
$\Lambda$ is an average spacing of the at least one index grating, and
$\lambda$ is a wavelength of the recording wave;
second illuminating said at least one photosensitive layer with a recording wave having a second angle of incidence with respect to said plane of said at least one photosensitive layer while performing said first illuminating step; and
after recording and development of the photosensitive layer applying a light-absorbing layer to a back surface of said at least one photosensitive layer, said back surface being opposite to a front surface on which an image is to be formed,
wherein a combination of the at least one photosensitive layer and the light-absorbing layer are configured to absorb light which is not incident on the at least one photosensitive layer at the second angle of incidence of the recording wave, and
wherein light incident on the at least one photosensitive layer at the second angle of incidence is reflected.

7. A method according to claim 6, wherein:
in said first step illuminating step, said first angle of incidence defines a direction in which an observer observes said at least one photosensitive layer; and
in said second illuminating step, said second angle of incidence defines a direction in which an image is to be projected upon said at least one photosensitive layer.

8. A method according to claim 6, wherein:
said first illuminating step illuminates a back surface of said at least one photosensitive layer, said back surface being opposite to a front surface in which an image is to be projected; and
said second illuminating step illuminates said front surface.

9. A method according to claim 6, wherein said first illuminating step and said second illuminating step illuminate a back surface of said at least one photosensitive layer, said back surface being opposite to a front surface on which an image is to be projected.

10. A method according to claim 6, wherein said at least one photosensitive layer comprises a stack of photosensitive layers which are respectively photosensitive to a particular recording wavelength, and said first illuminating step and said second illuminating step illuminate each layer using a recording wave having said particular wavelength so that a layered grating is recorded in said each layer.

11. A method according to claim 6, wherein said at least one photosensitive layer comprises a stack of photosensitive layers which are respectively photosensitive to wavelengths of different primary colors, and each layer of said stack of photosensitive layers are either simultaneously or successively illuminated by said first illuminating step and said second illuminating step.

12. A holographic screen, comprising:

at least one photosensitive layer having at least one index grating formed by the step of interfering a recording wave having a first angle of incidence with respect to a plane of said at least one photosensitive layer, and a scattered object wave having a second angle of incidence with respect to the plane of said at least one photosensitive layer and being formed by transmitting a plane wave through a scattering grating; and
a light-absorbing layer disposed on a back surface of said at least one photosensitive layer, said back surface being opposite to a front surface on which an image is to be formed,
wherein a thickness (t) of said at least one photosensitive layer is defined by:

$$(t \geq (n_0 \Lambda^2)/(2\pi\lambda))$$

where $n_0$ is an average index of said at least one photosensitive layer;
$\Lambda$ is an average spacing of the at least one index grating; and
$\lambda$ is a wavelength of the recording wave,
wherein a combination of the at least one photosensitive layer and the light-absorbing layer are configured to absorb light which is not incident on the at least one photosensitive layer at the first angle of incidence of the recording wave, and
wherein light incident on the at least one photosensitive layer at the first angle of incidence is reflected.

13. A holographic projection screen, according to claim 12, wherein said at least one photosensitive layer is disposed in one of a front-projection screen or a back-projection screen.

14. A holographic projection screen according to claim 12, wherein said at least one photosensitive layer comprises a stack of photosensitive layers which are respectively photosensitive to a particular recording wavelength.

15. A holographic projection screen according to claim 12, wherein said at least one photosensitive layer comprises three photosensitive layers which are respectively photosensitive to wavelengths of different primary colors.

16. A holographic screen, comprising;

at least one photosensitive layer recorded by interference between a recording wave having a first angle of incidence with respect to a plane of said at least one photosensitive layer, and a scattered object wave having a second angle of incidence with respect to the plane of said at least one photosensitive layer and being formed by transmitting a plane wave through a scattering grating; and
a light-absorbing layer disposed on a back surface of said at least one photosensitive layer, said back surface being opposite to a front surface on which an image is to be formed,
wherein said at least one photosensitive layer is photosensitive to a range of wavelengths comprising three-primary color wavelengths, $\lambda$ being an average wavelength of said range of wavelengths, and wherein a thickness (t) of said at least one photosensitive layer is defined by:

$$(t \geq (n_0 \Lambda^2)/(2\pi\lambda))$$

where $n_0$ is an average index of said at least one photosensitive layer;

$\Lambda$ is an average spacing of the at least one index grating; and $\lambda$ is a wavelength of the recording wave, wherein a combination of the at least one photosensitive layer and the light-absorbing layer are configured to absorb light which is not incident on the at least one photosensitive layer at the first angle of incidence of the recording wave, and wherein light incident on the at least one photosensitive layer at the first angle of incidence is reflected.

17. A holographic screen according to claim 16, wherein the three monochromatic functions are recorded at the same incident angle.

* * * * *